Figure 1:
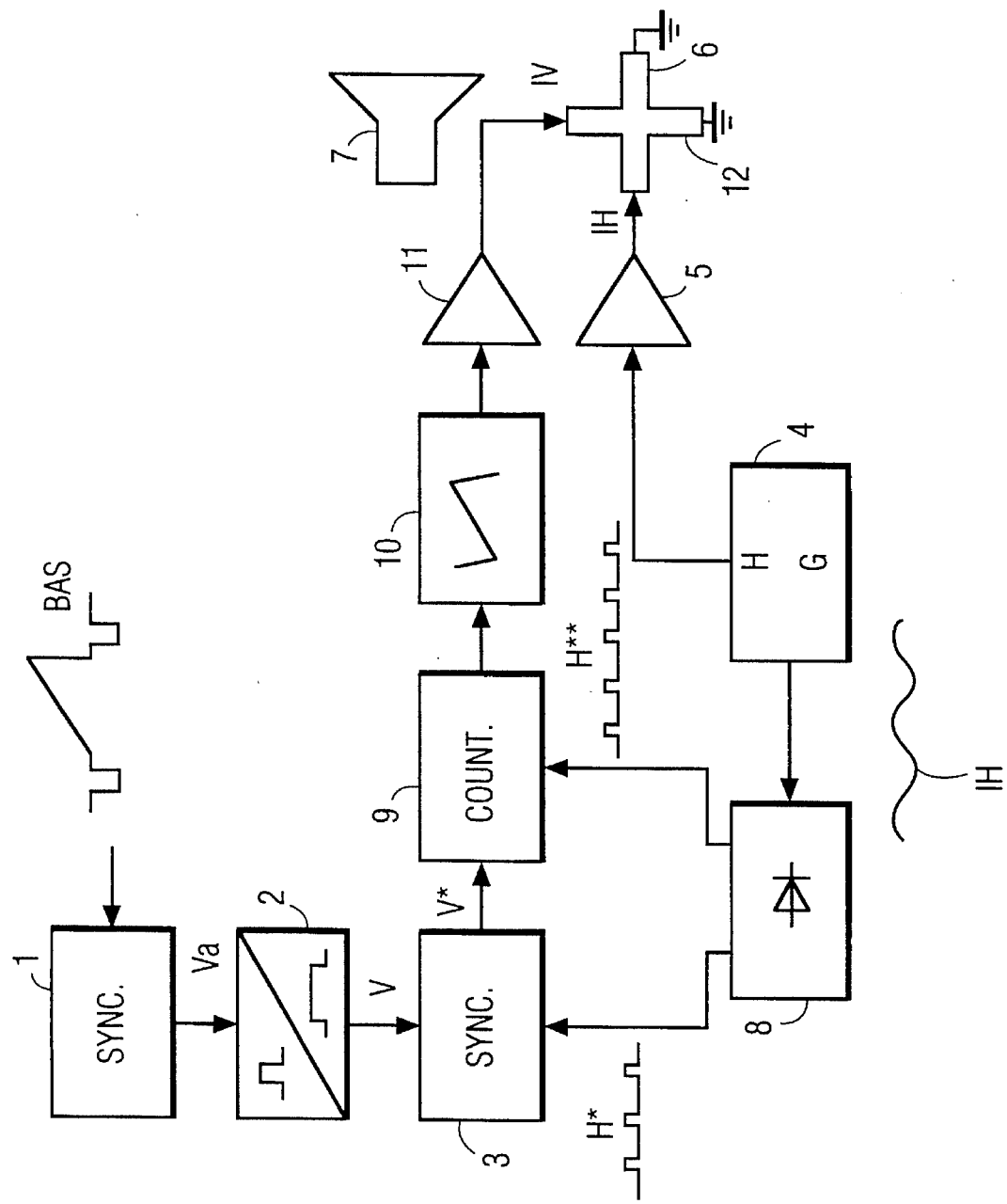

United States Patent [19]
Hirtz

[11] Patent Number: 5,548,191
[45] Date of Patent: Aug. 20, 1996

[54] VERTICAL DEFLECTION CIRCUIT FOR A TELEVISION RECEIVER

[75] Inventor: Gangolf Hirtz, Niederesrach, Germany

[73] Assignee: Deutsche Thomson-Brandt GmbH, Villigen-Schwenningen, Germany

[21] Appl. No.: 46,963

[22] Filed: Jun. 16, 1993

[30] Foreign Application Priority Data

May 4, 1992 [DE] Germany ............... 42 14 338.1

[51] Int. Cl.$^6$ .............. H01J 29/70; H01J 29/76
[52] U.S. Cl. ........................ 315/399; 348/530
[58] Field of Search .................. 315/399; 348/529, 348/530, 531

[56] References Cited

U.S. PATENT DOCUMENTS 4,351,002  9/1982  Decraemer et al. .
5,369,444 11/1994  Ersoz et al. ............. 348/598

FOREIGN PATENT DOCUMENTS 0293099 12/1988 European Pat. Off. ......... H04N 3/30

*Primary Examiner*—Theodore M. Blum
*Attorney, Agent, or Firm*—Joseph S. Tripoli; Frederick A. Wein

[57] ABSTRACT

It is the object to create a vertical deflection circuit which is suitable, in particular, for a symmetric deflection with a sinusoidal deflection current and a free-running horizontal deflection circuit not synchronised by the input signal.

A vertical pulse derived from the received signal and a horizontal pulse (H*) derived from the horizontal deflection circuit are applied to the synchronising inputs of the vertical deflection circuit in such a manner that the vertical deflection in each case begins with the first horizontal pulse following an edge of the vertical pulse (V) derived from the received signal and ends in a wait position preceding the next vertical pulse (V).

Suitable, in particular, for television receivers with a symmetric free-running horizontal deflection not synchronised by the input signal.

9 Claims, 4 Drawing Sheets

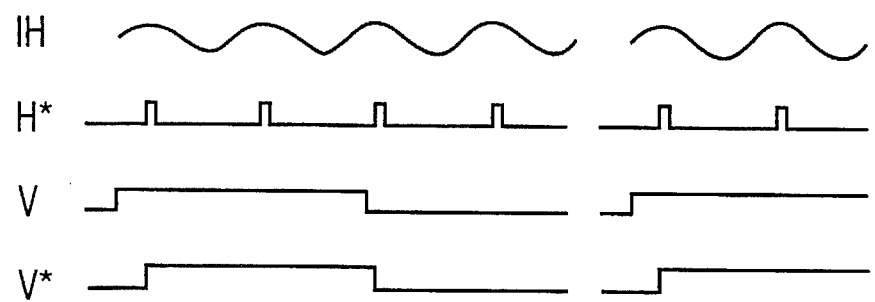
FIG. 2
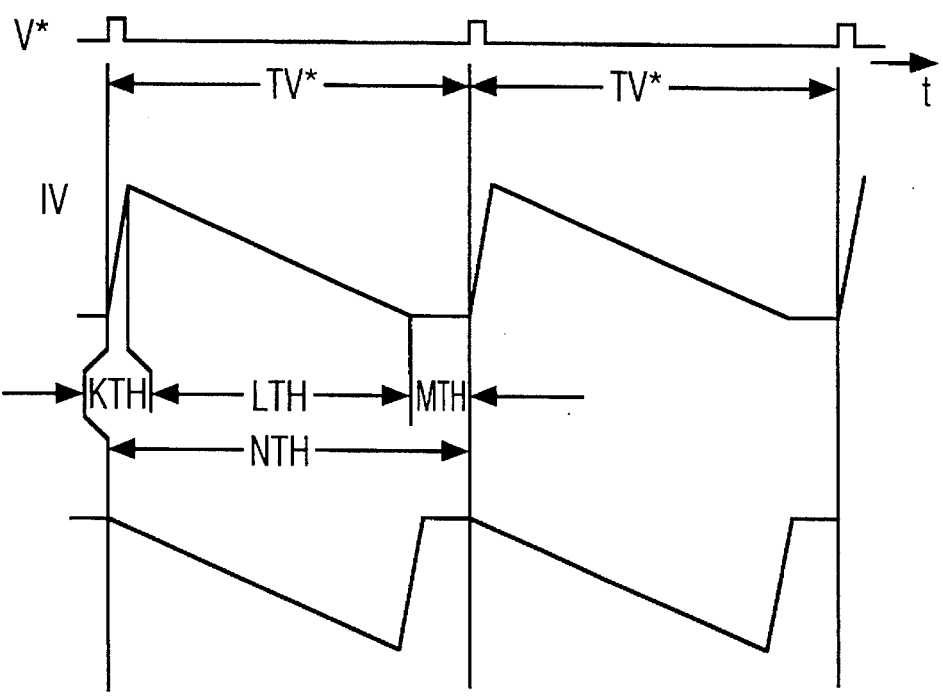
FIG. 3a
FIG. 3b
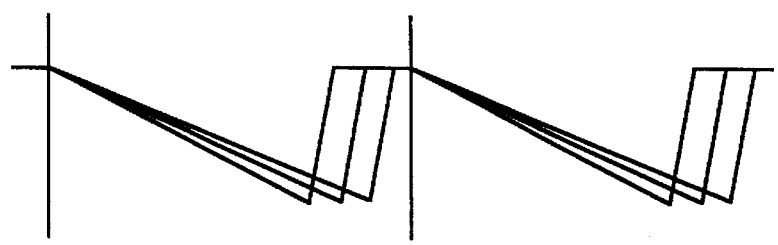
FIG. 3c

VERTICAL DEFLECTION CIRCUIT FOR A TELEVISION RECEIVER

The invention is based on a vertical deflection circuit according to the precharacterising clause of Claim 1. Conventional deflection systems have one oscillator circuit each for the horizontal and the vertical deflection, which are in each case synchronised by the received signal. The number of lines per vertical deflection period is thus directly predetermined by the received signal and is constant.

In systems with symmetric horizontal deflection, in which one line n is written from left to right and the next line n+1 is written from right to left on the screen, it is known to use a sinusoidal horizontal deflection current, the period of which is equal to the duration of two lines, for reasons of saving power. Such circuits have the advantage that the horizontal deflection can be constructed as a resonant circuit. The video signal is adapted to the line period by temporarily storing the received video signal. However, the resonant frequency of such a resonant circuit is subject to fluctuations due to temperature drift, component ageing and component tolerances. Although it is possible to stabilise the resonant frequency by means of controllable inductances or capacitances, this requires considerable circuit complexity. In addition, a phase-locked synchronisation of the sinusoidal horizontal deflection current with the received signal easily leads to intolerable disturbances in the symmetry of the sweep and flyback deflection signal.

It is therefore known to provide a horizontal deflection circuit which is not synchronised by the input signal and which is absolutely free-running and the resonant frequency of which is only within the range of half the line frequency of the received signal. The resultant resonant frequency is therefore half the input line frequency since two lines, one in the sweep direction and one the flyback direction, are shown per period of the deflection signal. In this arrangement, this resonant frequency is preferably slightly higher so that, when the resonant frequency is reduced, it does not drop below half the horizontal frequency of the input signal, or only by a little.

The video signal is written into a buffer with a clock extracted from the input signal and read out again with a clock which is asynchronous to this and is only synchronised by the free-running horizontal deflection signal. The reading-out occurs in the inverse direction in every second line. In such a circuit, it is necessary to couple the vertical deflection to the vertical pulse of the received signal since otherwise the storage requirement can become very high or infinite.

The invention is based on the object of creating a vertical deflection circuit for a television receiver which requires a minimum storage capacity for the video signal and is especially suitable for a free-running non-synchronised horizontal deflection circuit. This object is achieved by the invention specified in Claim 1. Advantageous further developments of the invention are specified in the subclaims.

The circuit according to the invention has several advantages. Firstly, it is ensured that, in spite of the non-synchronised horizontal deflection, the vertical deflection period of the vertical deflection circuit is equal to the vertical period of the received signal on average and thus the demands on the storage capacity of the buffer memory for the video signal do not rise to an unwanted degree. Although the line number of the horizontal deflection circuit is not equal to the line number of the received signal but preferably higher, for example in the range between 625 and 635, the increased line number, which is also subject to fluctuations, is compensated for by the fact that more or fewer lines are inserted at the end of the vertical period, in which, however, no picture is displayed. The active line number for writing the picture remains constant. The invention can be preferably used for a symmetric deflection with sinusoidal line deflection current.

Figure 4:
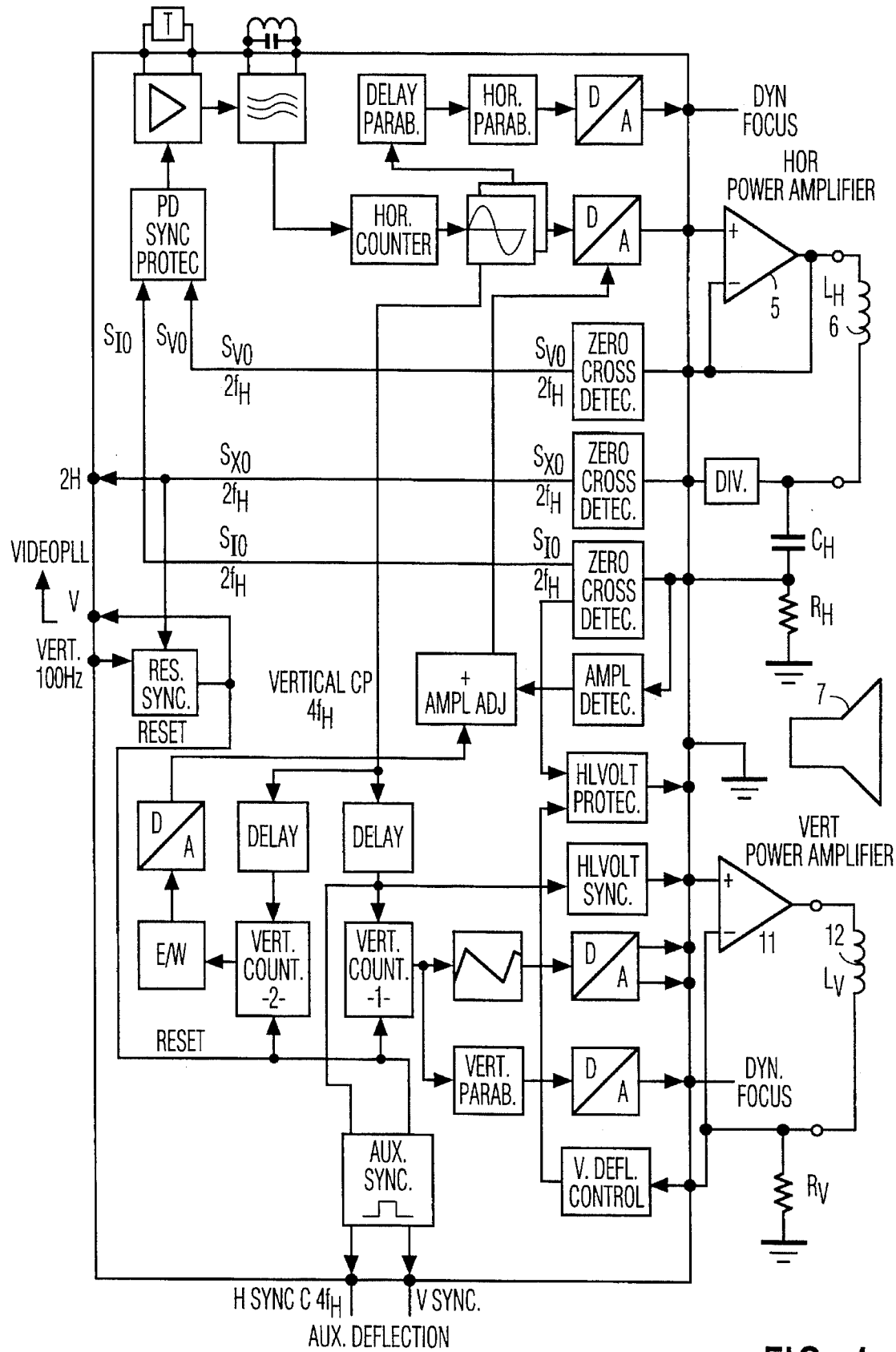
Figure 5:
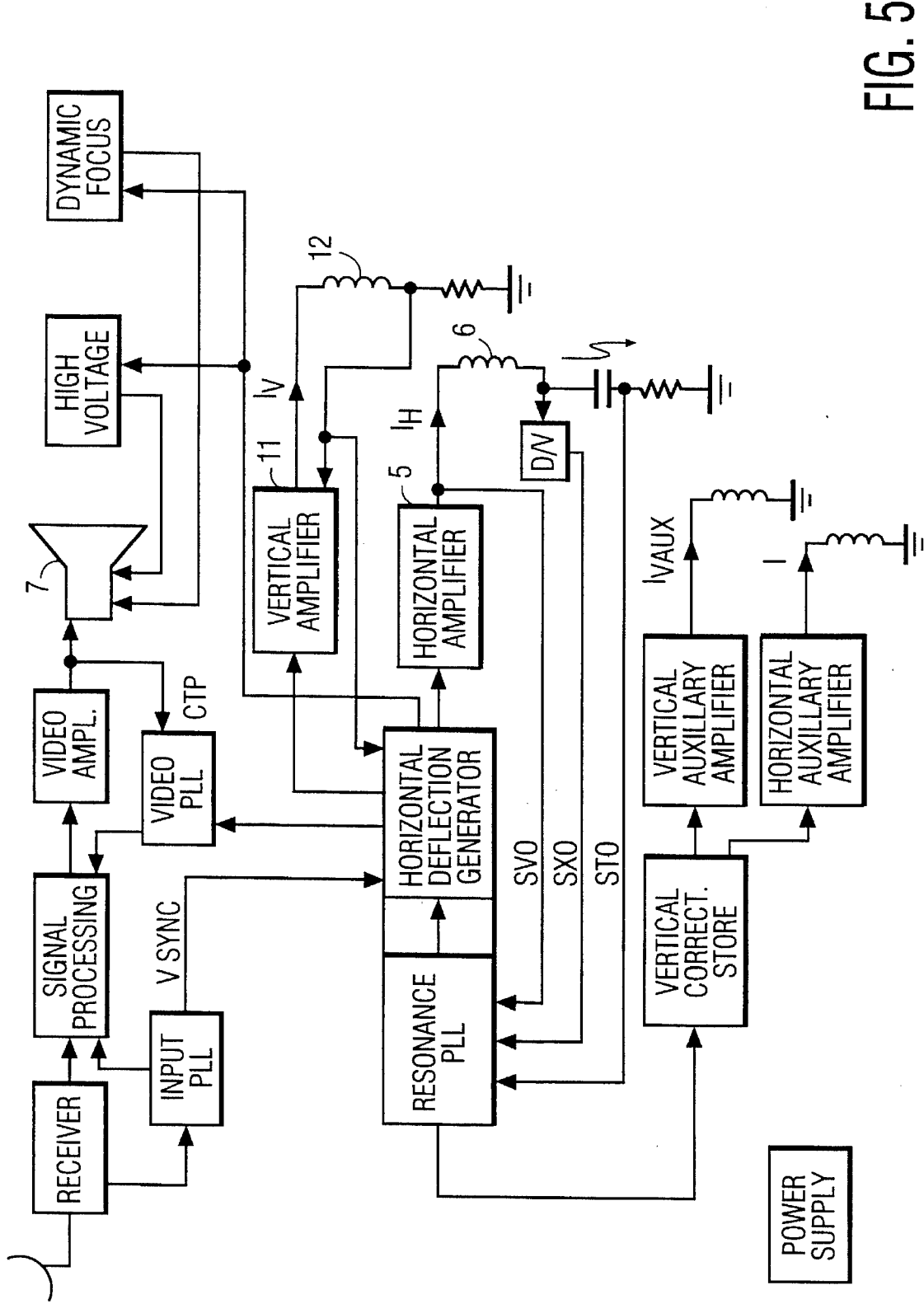

In the text which follows, the invention will be explained with reference to an illustrative embodiment shown in the drawing, in which:

FIG. 1 shows a block diagram of a television receiver with the vertical deflection circuit according to the invention, FIGS. 2, 3 show curves for explaining the operation of the circuit according to FIG. 1, and FIGS. 4, 5 show two block diagrams for the horizontal deflection circuit and the vertical deflection circuit in a television receiver in which the invention can be advantageously applied.

In FIG. 1, the composite video signal passes to the synchronisation signal separating stage 1 which supplies the separated vertical synchronisation signal Va. Va passes to the pulse shaper 2 which generates the vertical pulse V with a duration of two lines according to FIG. 2. V passes to the re-synchronisation stage 3.

The free-running horizontal oscillator 4, which is not synchronised by the input signal, controls the line deflection coils 6 for the picture tube 7 with a sinusoidal deflection current IH via the output stage 5.

During one period of this deflection signal, two lines are displayed on the screen. The deflection current IH also passes to the detector 8 in which a horizontal pulse H* which is phase-synchronous with the deflection current is derived from the current IH. In the case of a symmetric deflection, the pulse H* occurs in every second line and thus also supplies information on the direction of deflection. The pulse H* passes to stage 3 and there has the effect that the vertical pulse V is synchronised with the pulse V* derived from the horizontal deflection signal, as a result of which the re-synchronised pulse V* according to FIG. 2 is produced at the output of stage 3. V* is thus phase-locked to H*. The signal V is slightly longer than one line period so that it can still be resynchronised by the pulse H* when the horizontal deflection frequency is lower than the input frequency. In the example shown, V* has the duration of two lines. Increasing the horizontal deflection frequency makes it possible for the vertical signal derived from the input signal to be resynchronised several times, for example three times and thus resynchronised vertical signals V* of different lengths to be obtained from one vertical period to the next. It is therefore important that only the first edge of the resynchronised vertical signal V* is used for the further signal processing. This resynchronisation ensures that the time between two vertical pulses is now precisely an even multiple of the line period of the horizontal deflection signal.

The symbols shown have the following meaning:

$$T_V^* = N\, T_H^*$$

$T_H^*$: Line period of the horizontal deflection signal or $$T_V^* = N/2\, f_H^*$$

$f_H^*$: Frequency of the horizontal deflection signal $T_V^*$: Period of the resynchronised vertical signal It is obvious that the period of the resynchronised vertical signal V, is equal to the period of the received vertical signal only as an average. Due to the changing horizontal deflection frequency fH, a permanently changing line number N is obtained for each vertical deflection period. This is achieved by the fact that the vertical synchronisation signal is used as starting pulse for the vertical deflection signal. This vertical deflection signal is composed of a constant number of clock cycles K for the flyback signal and a constant number of clock cycles L for the vertical deflection sweep signal. After passing through these K+L clock cycles, the deflection signal initially remains in a waiting position. The cycle only recommences after the signal V* appears again.

As a variant, the deflection cycle triggered by the vertical synchronisation signal V, can also begin with the sweep as is shown in FIG. 2b, and the wait cycle can be inserted between flyback and sweep. Combinations of these two possibilities are also conceivable.

Due to the changing horizontal frequency, changing deflection times are obtained for the sweep and the flyback. The consequence of this is that the total number of lines N, and thus also the duration of the wait cycle, depends on the horizontal deflection frequency. This circuit variant ensures that the deflection amplitude remains constant, that a constant number of lines is always displayed on the screen and an asynchronous coupling of the vertical deflection signal to the receiver's deflection signal is possible without changes in the horizontal deflection frequency having an influence on this.

The detector 8 also supplies the line-frequency horizontal pulse H for the counter 9, to the reset input of which the vertical pulse V, is applied. The clock H for the vertical counter 9 corresponds to the actual line frequency of the reproduced signal $$fH^{**}=2fH^*.$$

The vertical counter 9 reads the actual vertical deflection signal out of a buffer as is shown in FIG. 3. Once the sweep and flyback have been processed, the vertical counter 9 initially continues to count. However, the vertical signal read out of the buffer does no longer change now and remains constant until this cycle is started again from the beginning with another occurrence of the reset signal V*. It is not mandatory to implement the generation of the vertical deflection signal by means of a memory table.

The output voltage of the vertical counter 9 controls the actual vertical deflection circuit 10 which generates the vertical deflection current IV in the vertical deflection coils 12 via the vertical output stage 11.

The circuit can also be used for a conventional sawtooth-shaped deflection with flyback. This is required, for example, when a horizontal deflection is used which is asynchronous with respect to the input signal. The synchronisation signal H* is then derived from the sawtooth-shaped horizontal signal and also used at the same time for clocking the vertical counter. Inserting the time-variant wait cycle into the vertical deflection signal makes it possible to keep the amplitude of the vertical deflection signal, and thus the picture height, constant.

FIGS. 4, 5 show two complete block diagrams for the horizontal deflection and the vertical deflection in a television receiver, which can operate in accordance with the principle according to FIGS. 1 to 3. Components corresponding to those in FIG. 1 are thus provided with the same reference numbers.

I claim:

1. A vertical deflection circuit for a television apparatus having a horizontal deflection circuit of which is free-running and not synchronized by an input signal, a horizontal pulse being derived from a line deflection current of said horizontal deflection circuit, comprising:

means for deriving vertical pulses from a provided television signal and applying said vertical pulses to the vertical deflection circuit, means for applying the horizontal pulse to a synchronizing inputs of the vertical deflection circuit so that the vertical deflection begins with a first horizontal pulse following an edge of one of the vertical pulses and ends in a pause preceding a next vertical pulse.

2. The circuit according to claim 1, wherein a vertical synchronization pulse separated from a received signal is applied to a pulse shaper which generates a vertical pulse.

3. The circuit according to claim 1, wherein the vertical pulse and the horizontal pulse are applied to input terminals of a synchronization stage which generates a vertical pulse which is resynchronized with one edge to the horizontal pulse.

4. The circuit according to claim 1, wherein a line-frequency horizontal pulse is applied to a counting input of a vertical counter, the vertical pulse is applied to a reset input of the counter, and an output voltage of the counter is used for controlling the vertical deflection circuit.

5. The circuit according to claim 1, wherein the vertical pulse is used for triggering a sweep of vertical deflection.

6. The circuit according to claim 1, wherein the vertical pulse is used for triggering a flyback of vertical deflection.

7. The circuit according to claim 1, wherein a frequency of a free-running horizontal deflection circuit is dimensioned so that the number of lines per vertical period is greater than the line number of the television standard, so that when a horizontal deflection frequency is reduced, it is ensured that an active line number for a sweep and an active line number for flyback remain constant.

8. The circuit according to claim 1, wherein the horizontal deflection is a symmetric deflection using a sinusoidal deflection current, the period of which is equal to a duration of two lines.

9. The circuit according to claim 7, wherein a vertical pulse triggers the deflection signal at an arbitrary point in one of the vertical periods.

\* \* \* \* \*